United States Patent [19]

Finsterwalder et al.

[11] 4,312,288
[45] Jan. 26, 1982

[54] FLOATING STRUCTURE FOR EFFECTING ENERGY TRANSFORMATION FROM SEA WATER

[75] Inventors: Klemens Finsterwalder, Berg; Erich Aigner, Munich, both of Fed. Rep. of Germany

[73] Assignee: Dyckerhoff & Widmann Aktiengesellschaft, Munich, Fed. Rep. of Germany

[21] Appl. No.: 941,786

[22] Filed: Sep. 12, 1978

[51] Int. Cl.³ .................. B63B 35/44; F03G 7/04
[52] U.S. Cl. ................... 114/264; 60/641.7
[58] Field of Search .............. 9/8 R, 8 P; 114/264, 114/265, 266, 267; 290/42–44, 52–54; 405/75, 76; 60/495, 497, 498, 641 B

[56] References Cited

U.S. PATENT DOCUMENTS

| 3,912,938 | 10/1975 | Filipenco | 290/42 |
| 3,922,739 | 12/1975 | Babintsev | 9/8 R |
| 3,995,160 | 11/1976 | Zener et al. | 60/641 |
| 4,014,279 | 3/1977 | Pearson | 114/151 |
| 4,083,189 | 4/1978 | Fetkovich | 60/641 |
| 4,155,323 | 5/1979 | Finsterwalder | 114/125 |

Primary Examiner—Trygve M. Blix
Assistant Examiner—Jesús D. Sotelo
Attorney, Agent, or Firm—Toren, McGeady & Stanger

[57] ABSTRACT

A floating structure is used for transforming thermal energy in sea water into another form of energy, such as electrical energy. The structure consists of a floating body with a tube extending downwardly from the center of the body for a considerable depth into the water for drawing cooler water upwardly for use in the energy transformation process. The floating body may be a single floating element or a group of such elements connected together, preferably in a symmetrical arrangement. The floating element includes a downwardly open air chamber in its lower surface. The outer wall of the air chamber forms a number of passageways for drawing warmer sea water upwardly from near the water surface for use in the energy transformation process.

18 Claims, 7 Drawing Figures

FLOATING STRUCTURE FOR EFFECTING ENERGY TRANSFORMATION FROM SEA WATER

SUMMARY OF THE INVENTION

The present invention is directed to a floating structure for transforming thermal energy from sea water into another form of energy, such as electrical energy. The structure includes a floating body in which the apparatus for transforming the energy is located and a tube extending downwardly below the water surface for a considerable depth for drawing cooler water upwardly for use in the energy transformation process.

In the search for additional energy sources independent of the mineral resources found in the earth, such as in the utilization of solar energy, consideration has been given to the concept of vaporizing the warmer sea water located near the water surface by means of pressure reduction for generating steam to operate a steam turbine with the subsequent condensation and return of the condensate back into the sea. Since the greatest temperature differential possible should be used for condensation, it is necessary to draw the cooler water from a considerable depth below the water surface by means of a tube which reaches downwardly for approximately 900 meters.

While it is possible to provide the necessary apparatus for effecting the energy transformation, the design of the structure for supporting the apparatus poses considerable problems. The structure must include a floating body containing the necessary passageways for the flow of the warmer and cooler water, along with space for the energy transformation apparatus and for accommodating operating personnel. Further, the floating body must be connected to a tube which may be 900 meters long. Like other structures floating in the open sea, it must be dimensioned to withstand the most unfavorable wave and wind conditions. If the floating body and the tube depending from it are rigidly connected together, due to the length of the tube this is the only possibility that is technically feasible, the movements of the floating body are significantly restricted because of the tube length. As a result, extremely high bending moments occur where the tube is fixed to the floating body and in the platform atop the floating body. The size of these bending moments are in direct dependence on the height and frequency of the wave action which prevail at the location in the open sea at which the floating body is to be used. In most locations the height of the waves is so great that significant stresses occur especially at the location where the tube is secured to the floating body. Based on the presently known structures it is not possible to adapt to such stresses.

Therefore, it is a primary object of the present invention to provide a floating structure capable of withstanding the stressed conditions anticipated.

In accordance with the present invention, the floating structure includes a floating body having a platform which floats on the water surface and is connected to the downwardly depending tube in a bending-resistant manner. The tube extends perpendicularly relative to the platform. In addition, a chamber is provided in the lower surface of the floating body to provide an air cushion enclosed by an annular wall.

Preferably, the floating body and the tube in the region of its connection to the body are constructed of reinforced concrete or prestressed concrete.

Based on the present invention, the weight of the entire structure is carried by the air cushion enclosed in the downwardly open annular chamber located in the lower surface of the floating body. As a result, the load distribution below the platform remains constant independent of the influence of the wave action, so that no significant bending forces caused by the wave action in the open sea are generated in the platform. Due to its moment of inertia in the region of the water surface, the floating body has a similar behavior with regard to rolling motion as a semi-submersible floating structure. The bending moments developed in the tube are small and the rolling motions are also small. Due to the large area of the floating body at the water surface, the platform acts in a manner similar to a pontoon with regard to heaving motion, that is, the heaving motions of such a structure are relatively insignificant.

As a rule, a floating body of this type requires a stable equilibrium. In the arrangement of the present invention with the interaction of the very long bending resistant tube, such stability can be achieved without any problems.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
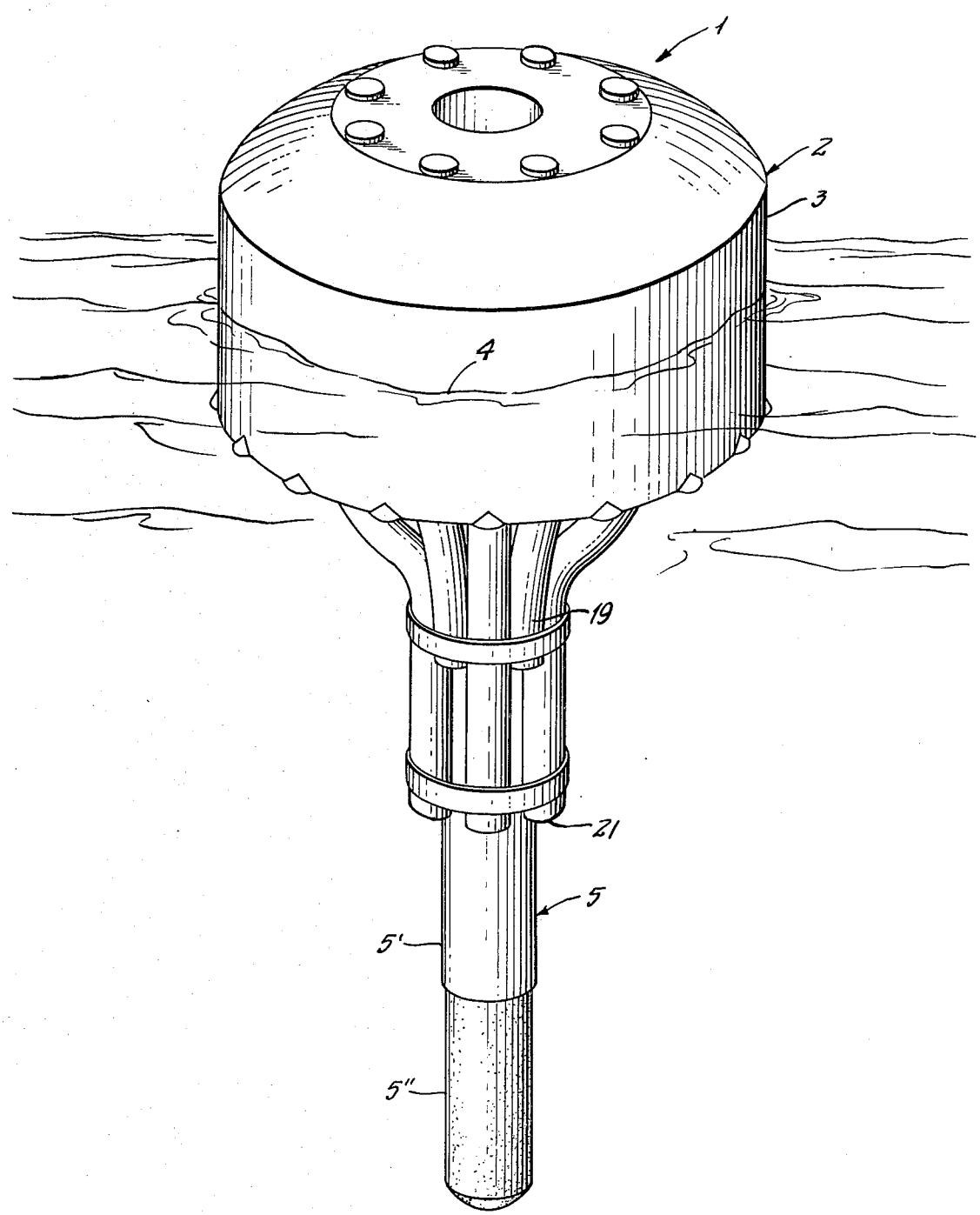
FIG. 1 is a perspective view of a floating structure embodying the present invention.
Figure 2:
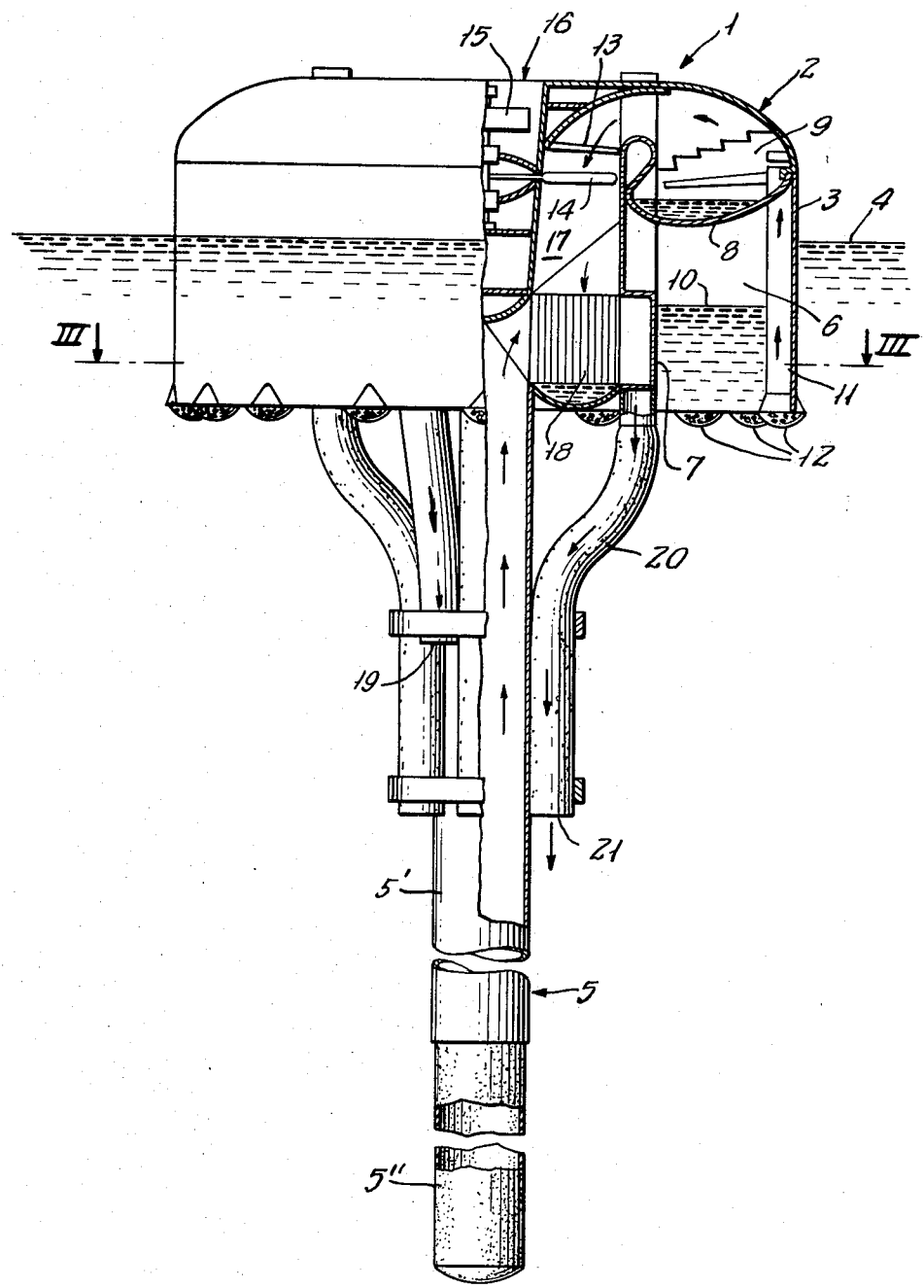
FIG. 2 is a vertical view, partly in section, of the floating structure illustrated in FIG. 1.
Figure 3:
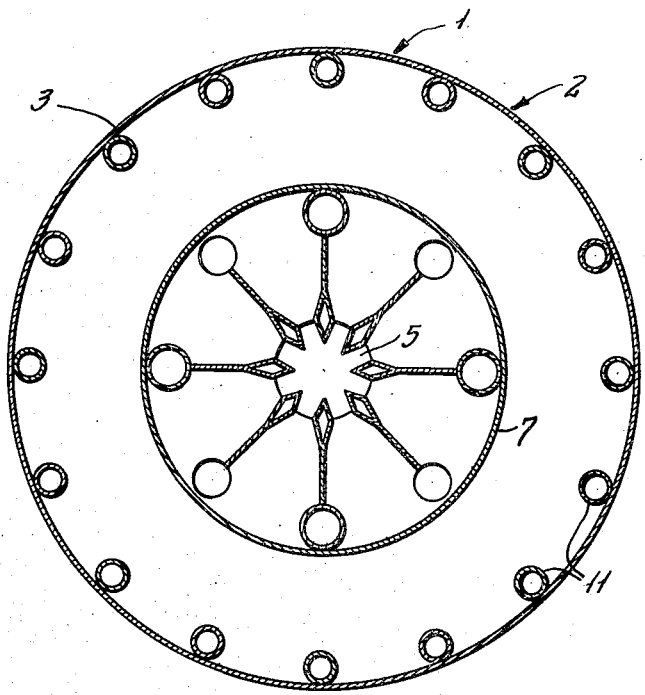
FIG. 3 is a horizontal sectional view taken along the line III—III in FIG. 2.

In FIG. 1 a floating structure 1 embodying the present invention is shown in a body of sea water, such as in the open sea. The structure 1 includes a floating body 2 which is circular in plan view. The floating body 2 can be constructed of reinforced concrete or prestressed concrete. The upper surface of the floating body forms a platform which, as shown in FIG. 1, has a circular or arcuate circumferentially extending boundary, however, it could be polygonal. A vertical outer wall 3 defines the circumferential outer surface of the floating body and a portion of the wall extends above the water level or surface 4 with the remaining portion extending below the water surface. As can be seen in FIGS. 2 and 3, a tube 5 extends perpendicularly downwardly from the center of the floating body 2. The tube is of a considerable length and extends downwardly from the water surface by at least several hundred meters. Tube 5 consists of an upper portion 5' projecting downwardly from the floating body and formed of one of reinforced concrete or prestressed concrete and a lower portion 5" extending downwardly from the lower end of the upper portion 5' and formed of rubber. The upper portion 5' of the tube has an axial length of at least twice the diameter of the floating body, that is, the upper concrete portion of the tube for purposes of stability has at least the indicated length.

In FIG. 2 a partial sectional view is provided of the floating structure 1 illustrated in FIG. 1. It can be seen in FIG. 2 that the vertical outer wall 3 extends downwardly below the water level 4 and forms the radially outer boundary of an annular hollow space 6 within the interior of the floating body 2. The lower end of the hollow space or chamber 6 is open to the body of water in which the structure 1 floats and the radially inner boundary of the chamber 6 is defined by a vertical wall 7 while the upper end of the chamber is closed by a bottom plate 8 of an annular evaporator space 9 positioned above the chamber. Evaporators are positioned within the space 9. As shown, the annular chamber 6 is partly filled with water with the remainder of the upper portion of the chamber containing an air cushion in the volume between the surface of the water within the chamber and the bottom plate 8. The air cushion within the chamber 6 carries the floating body 2.

The various components for transforming the thermal energy of the sea water into another form of energy are not the subject matter of the invention, accordingly, they are described only in a cursory manner. Located on the inner side of vertical wall 3 are a plurality of circumferentially spaced apart tubes 11 for conveying warmer sea water from near the water surface 4 into the structure 1. The warmer sea water enters each of the tubes 11 through an inlet 12 located below the water surface at the lower end of the vertical wall 3. Pumps, not shown in the drawing, suck the warmer sea water upwardly into the evaporator space 9 where the water is evaporated by pressure reduction. As a result, steam is generated and is directed through a stator 13 and a rotor 14 which, in turn, drives a generator 15. Generator 15 is located in the central portion 16 of the structure 1. After flowing through the turbine structure, the steam flows through a distributor 17 into a condensor 18. From the condensor 18 the condensed warmer sea water is conveyed through a warmer sea water outlet 19 back into the sea.

To provide the requisite cooling effect in the condensor 18, cooler sea water is drawn upwardly through the tube 5 by means of pumps, not shown, and, after passage through the condensor, is conveyed downwardly through cooler water outlet lines 20 and outlet 21 back into the sea.

Figure 5:
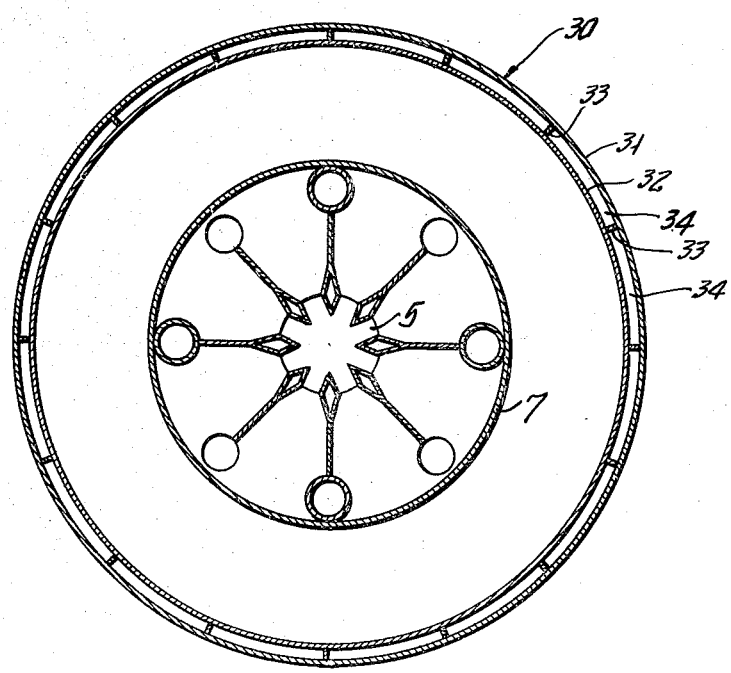
FIG. 5 is a horizontal sectional view taken along the line V—V in FIG. 4.
Figure 4:
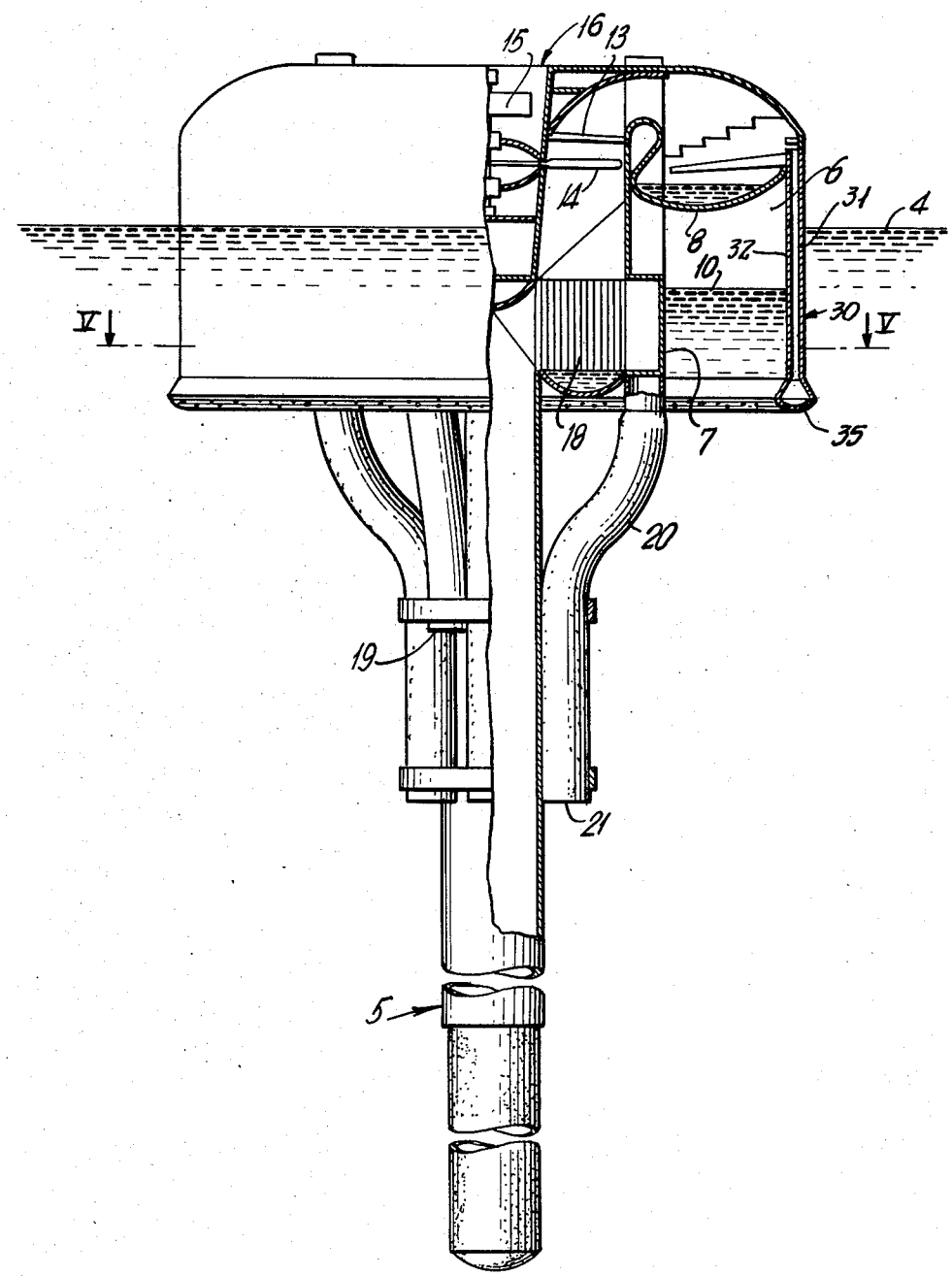
FIG. 4 is a vertical view, partly in section, similar to that of FIG. 2, illustrating another embodiment of the present invention.

In the first embodiment disclosed in FIGS. 1–3, the passageways for the inlet flow of the warmer sea water are provided in the form of tubes 11 located in the inner surface of the vertical outer wall 3. By contrast, in the embodiment illustrated in FIGS. 4 and 5, the outer wall 30 corresponding to the outer wall 3 in the first embodiment, consists of a radially outer wall 31 and a radially inner wall 32 disposed in radially spaced relation and forming a double wall. The annular space between the outer wall 31 and inner wall 32 is divided into individual flow passages 34 by vertically and radially extending partition walls 33. The warmer water inlet 35 at the lower end of each of the vertically extending passageways 34 is formed in the shape of a funnel, similar to tubes 11 in FIG. 2.

Figure 6:
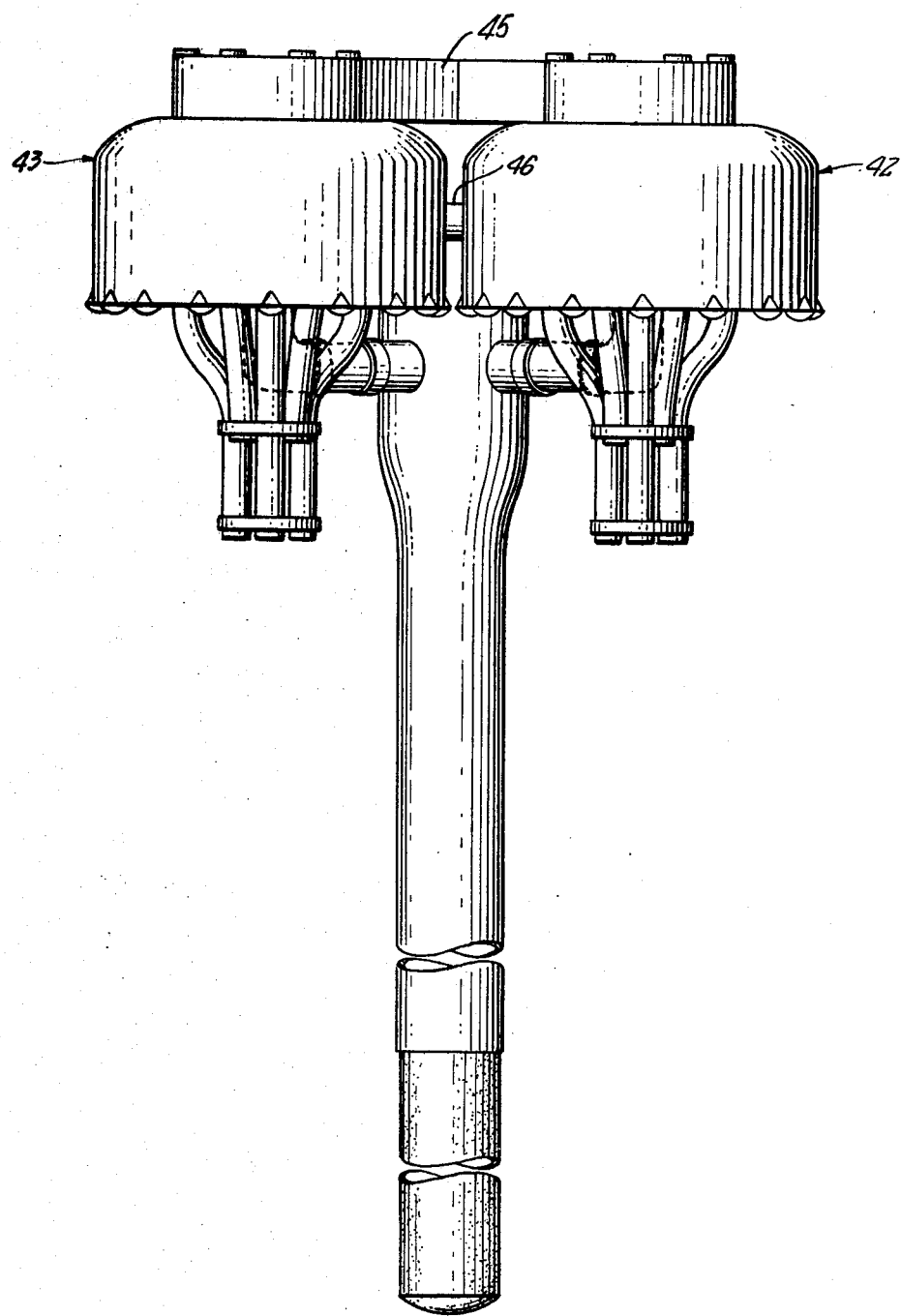
FIG. 6 is a vertical view of still another embodiment of the present invention.
Figure 7:
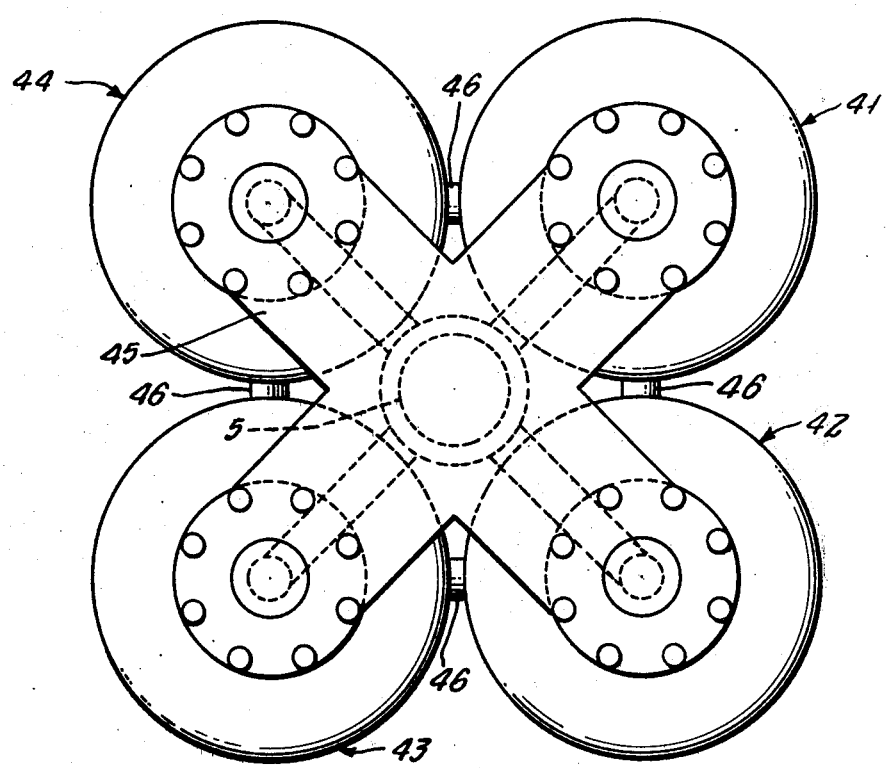
FIG. 7 is a top view of the embodiment illustrated in FIG. 6.

While the embodiments illustrated in FIGS. 1–5 show a single floating body, it is possible to combine several floating body elements to provide a larger floating structure. Such an arrangement is illustrated in FIGS. 6 and 7. Each of the floating body elements 41, 42, 43 and 44 are constructed similar to one of the previously described embodiments. The four elements 41, 42, 43 and 44 are disposed in a symmetrical arrangement about a center and they are interconnected by a cross-shaped beam or plate 45. Instead of the arrangement of tube 5 shown in the previous embodiments, in this multiple arrangement of the floating bodies, the tube 5 is arranged in the center of the four floating body elements 41–44 with means connecting the tube to the energy transforming apparatus in each of the floating body elements. Furthermore, each of the air chambers in the individual floating body elements 41, 42, 43 and 44 are interconnected via connecting conduits 46. Accordingly, during any wave action effecting the combined structure, a balancing of the various pressures acting on the structure from below is achieved.

While specific embodiments of the invention have been shown and described in detail to illustrate the application of the inventive principles, it will be understood that the invention may be embodied otherwise without departing from such principles.

What is claimed is:

1. Floating structure supported on a body of sea water having a water surface for transforming the thermal energy in warmer sea water located near the water surface into other forms of energy, particularly electrical energy, comprising a floating body, means positioned within said floating body for transforming the thermal energy of the warmer sea water into another form of energy, a tube depending downwardly from said floating body for a considerable depth below the water surface for conveying cooler sea water into said means, wherein the improvement comprises that said floating body is formed of one of reinforced concrete and prestressed concrete and includes a platform forming the upper exterior surface of said floating body and located upwardly from the water surface, said tube is formed of one of reinforced concrete and prestressed concrete and extends substantially vertically downward from said floating body, a bending-resistant connection formed of one of reinforced concrete and prestressed concrete interconnects said tube and said floating body, said floating body including wall means formed of one of reinforced concrete and prestressed concrete with at least one portion of said wall means extending downwardly from said platform to below the water surface and another portion extending transversely of the downward direction above the lower end of said one portion and below said platform so that said portions define a downwardly open annular chamber in said floating body extending inwardly from the inner surface of said one portion of said wall means toward said tube with said chamber being open at the lower end thereof so that water enters into and partially fills said chamber with an air cushion being formed above the water level in the chamber and said portions formed to retain the air cushion, said one portion of said wall means including an annular shaped wall extending downwardly from said platform and defining the laterally outer border of said chamber and said tube having a length downwardly from said bending-resistant connection of at least twice the diameter of said floating body.

2. Floating structure, as set forth in claim 1, wherein said platform has an outer circumferentially extending boundary and said annular shaped wall extends downwardly from said boundary.

3. Floating structure, as set forth in claim 2, wherein said circumferentially extending boundary of said platform is polygonal.

4. Floating structure, as set forth in claim 2, wherein said circumferentially extending boundary of said platform is arcuate.

5. Floating structure, as set forth in claim 2, wherein said circumferentially extending boundary of said platform is circular.

6. Floating structure, as set forth in claim 1 or claim 2 or claim 5, wherein said annular shaped wall extends vertically downwardly from said platform and has a shape in horizontal section corresponding to the circumferentially extending boundary of said platform.

7. Floating structure, as set forth in claim 1, wherein said floating body comprises a plurality of similarly shaped floating body elements, means interconnecting said floating body elements so that a bending-resistant connection is provided between said floating body elements, said tube disposed centrally of said floating body elements and extending downwardly therefrom, each said floating body element including said wall means defining a downwardly open chamber, and said chambers in said floating body elements being interconnected for the flow of air therebetween.

8. Floating structure, as set forth in claim 7, wherein said floating body elements are arranged symmetrically around said tube.

9. Floating structure, as set forth in claim 8, wherein said interconnecting means comprises a beam-like member interconnecting said floating body elements.

10. Floating structure, as set forth in claim 7, wherein each said floating body element includes one said annular shaped wall defining the laterally outer boundary of said chamber therein.

11. Floating structure, as set forth in claim 10, wherein said annular shaped wall is polygonal.

12. Floating structure, as set forth in claim 10, wherein said annular shaped wall is circular.

13. Floating structure, as set forth in claim 1, wherein said annular shaped wall has a plurality of upwardly extending passageways therethrough for conveying the warmer sea water to said means for transforming energy.

14. Floating structure, as set forth in claim 13, wherein said plurality of upwardly extending passageways comprises a plurality of upwardly extending tubes secured to the inside of said annular shaped wall with said tubes spaced apart about the circumference of said annular shaped wall.

15. Floating structure, as set forth in claim 13, wherein said annular shaped wall comprises a pair of upwardly extending annular shaped wall parts spaced apart in the horizontal direction and forming an annular space therebetween, and generally radially extending partitions extending between and connected to said wall parts and forming in combination therewith said plurality of upwardly extending passageways through said annular shaped wall.

16. Floating structure, as set forth in claim 1, wherein said tube has a circular transverse section.

17. Floating structure, as set forth in claim 1, wherein first outlet tubes are connected to and extend downwardly from said floating body to below said chamber for discharging the warmer sea water from said energy transforming means to below the water surface, and second outlet tubes connected to and extending downwardly from said floating body to below said chamber for discharging the cooler sea water from said energy transforming means to below the water surface.

18. Floating structure, as set forth in claim 1, wherein said tube has an upper part connected to and extending downwardly from said floating body, and a lower part connected to and extending downwardly from the lower end of said upper part and said lower part formed of rubber.

* * * * *